June 26, 1945.  W. E. TEMPLETON  2,379,198

HARVESTING COMBINE FOR POTATOES AND THE LIKE

Filed Jan. 22, 1942  7 Sheets-Sheet 1

INVENTOR
WILLIAM E. TEMPLETON,
BY Saywell & Wesseler,
ATTORNEYS.

June 26, 1945. W. E. TEMPLETON 2,379,198
HARVESTING COMBINE FOR POTATOES AND THE LIKE
Filed Jan. 22, 1942 7 Sheets-Sheet 2

INVENTOR:
WILLIAM E. TEMPLETON,
BY Saywell & Wesseler,
ATTORNEYS.

June 26, 1945.  W. E. TEMPLETON  2,379,198
HARVESTING COMBINE FOR POTATOES AND THE LIKE
Filed Jan. 22, 1942  7 Sheets-Sheet 4

INVENTOR:
WILLIAM E. TEMPLETON,
BY
Saywell & Wesseler,
ATTORNEYS.

June 26, 1945.　　　W. E. TEMPLETON　　　2,379,198
HARVESTING COMBINE FOR POTATOES AND THE LIKE
Filed Jan. 22, 1942　　　7 Sheets-Sheet 5

INVENTOR.
WILLIAM E. TEMPLETON.
BY
Sargwell & Wesseler,
ATTORNEYS.

June 26, 1945. W. E. TEMPLETON 2,379,198
HARVESTING COMBINE FOR POTATOES AND THE LIKE
Filed Jan. 22, 1942 7 Sheets-Sheet 7

INVENTOR:
WILLIAM E. TEMPLETON,
BY Sawell & Wesseler,
ATTORNEYS.

Patented June 26, 1945

2,379,198

UNITED STATES PATENT OFFICE 2,379,198

HARVESTING COMBINE FOR POTATOES AND THE LIKE

William E. Templeton, Transfer, Pa.

Application January 22, 1942, Serial No. 427,784

6 Claims. (Cl. 209—125)

This invention, as indicated, relates to a harvesting combine for potatoes and the like. More particularly it comprises a digging mechanism associated with a conveyor mechanism having sorting and sacking features associated therewith. The digger mechanism may be adapted for operating upon rows of potatoes planted in spaced relation in sandy soil or the like, but is also adapted to operate in potato fields designated as "muck." Heretofore it has been found extremely difficult to harvest potato crops grown in "muck" fields, which are areas of heavy vegetable growth presenting tangles of roots and vines and the like, and tending to entangle and obstruct ordinary types of harvesting apparatus. The present apparatus, however, is provided with hydraulic control of the blade level permitting an exact adjustment of the depth of cut and is accompanied by revolving coulters effectively freeing the side margins of the strip of soil operated on so as to provide harvesting mechanism of high efficiency for use under the difficult conditions mentioned.

In apparatus heretofore utilized for harvesting potatoes, the weight and length of such equipment has been very great and has increased the difficulties of handling the same in the field.

The principal object of the present invention is to obviate the difficulties above referred to and provide an apparatus adapted to dig potatoes at a high rate of output and to sort and sack them free of vines and other foreign matter.

Another object of the invention is to provide an articulated harvesting mechanism suitable for potatoes and other subsoil crops, such as peanuts, beets, turnips, and the like.

Another object of the invention is to provide a potato digging apparatus peculiarly adapted to operate in muck fields, wherein there is a great preponderance of vines and humus, without the usual difficulties of obstruction to the free working of the apparatus.

Another object of the invention is to provide a framed structure having a series of conveyor belts and sacking chutes whereby the harvested potatoes may be freed of foreign matter and conveyed to sacks or other receptacles ready for shipment to the market.

Another object of the invention is to provide a light type of apparatus having a tractor potato digger unit in advance of an elevated screening, sorting, and sacking mechanism of light weight and high efficiency of operation.

Another object of the invention is to provide a trailer mechanism adapted to be attached to and drawn by a digging unit for potatoes or other subsoil crops and to have a plurality of elements adapted to assist in freeing such crops of earth and foreign matter and placing the same in suitable receptacles.

Another object of the invention is to provide a light frame unit adapted to be operated as a screening, sorting and packaging apparatus for various materials to be classified and placed in suitable receptacles.

Another object of the invention is to provide a frame structure provided with a series of motor driven conveyors in spaced relation to each other to permit the screening, sorting and placing in receptacles of various articles at a high rate of operation.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but several of various forms in which the principle of the invention may be used.

In said annexed drawings:

Fig. 1 is a top plan view showing the complete apparatus embodying the principles of the invention, for digging, conveying, and sacking potatoes and the like;

Figure 1:
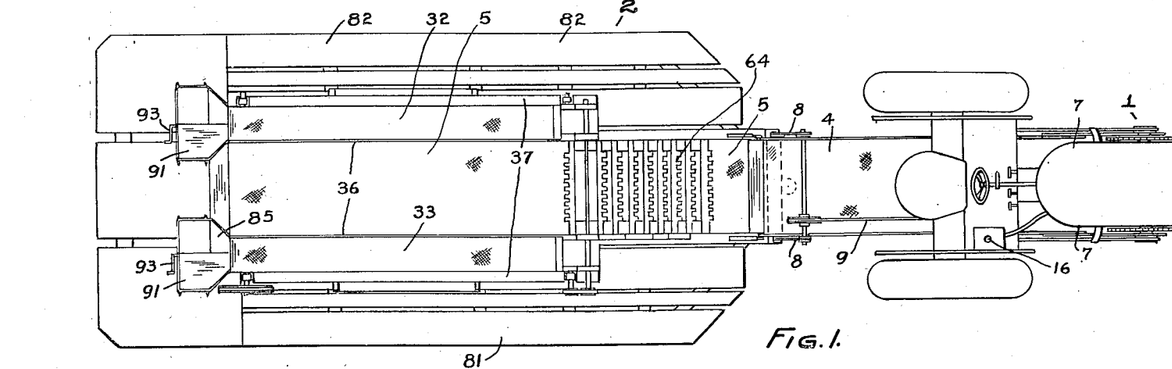
Figure 2:
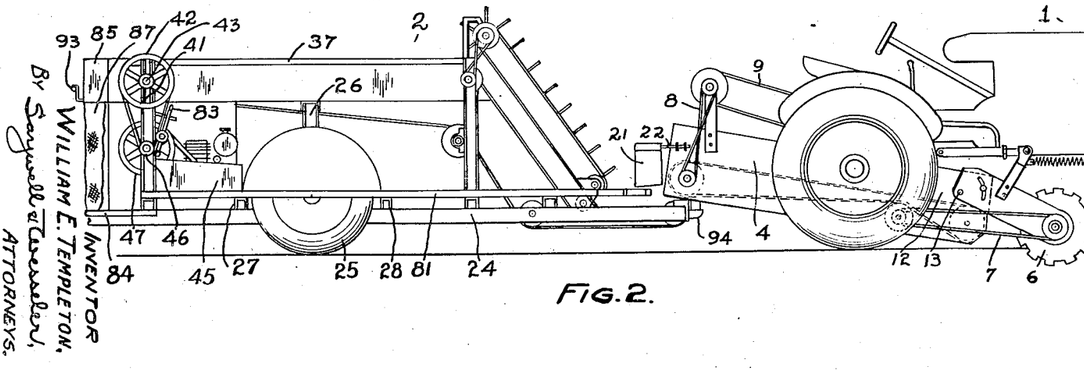
Fig. 2 is a side elevation of the structure shown in Figure 1.

As has been explained, the present invention is of general application, but is illustrated in Figures 1 and 2 particularly as a complete apparatus providing a continuous conveyor system adapted to perform one of the most difficult harvesting operations, such as digging potatoes from muck soil and placing them in receptacles such as sacks, ready for the market as a single continuous operation. It is well known that muck soil presents a tangle of vegetable vines and roots intermixed with earth and granular particles and providing a particularly favorable medium within which to produce a potato crop of excellent quality as well as a yield of satisfactory quantity. The harvesting of such crops has heretofore been a problem because of the high percentage of loss in the harvesting operation.

In addition to the problem of harvesting potatoes in muck soil there frequently arises the problem of harvesting potatoes in soils which are intermixed with field stones or conglomerated material which would obstruct or injure a bladed conveyor or elevating mechanism fixed to a rigid supporting frame. In the modified construction herewith illustrated, a semi-floating or full-floating bladed elevating conveyor is disclosed which will handle objects of substantial size which are met with in the course of harvesting operations in certain localities where the soil may have distributed therethrough certain relatively large field stones or other foreign matter.

The present invention provides a method and apparatus peculiarly adapted for the heavy duty service required for harvesting potatoes from muck soil areas. The apparatus is by no means limited to such service, but is useful for harvesting potatoes from every type of soil in which they may be successfully grown.

As shown in Figures 1 and 2 of the drawings the harvesting apparatus comprises a tractor unit 1, and a combine, or sorting and sacking unit 2. The tractor unit provides a digging blade 3, and a conveying belt 4 associated therewith, forming a digging apparatus or digging unit, which transfers the strip of potato laden earth onto a conveyor belt 5 on the combine unit, and thence to a point where the potatoes are finally placed in suitable receptacles or sacks, as will be hereinafter described in detail.

Figures 20, 21:
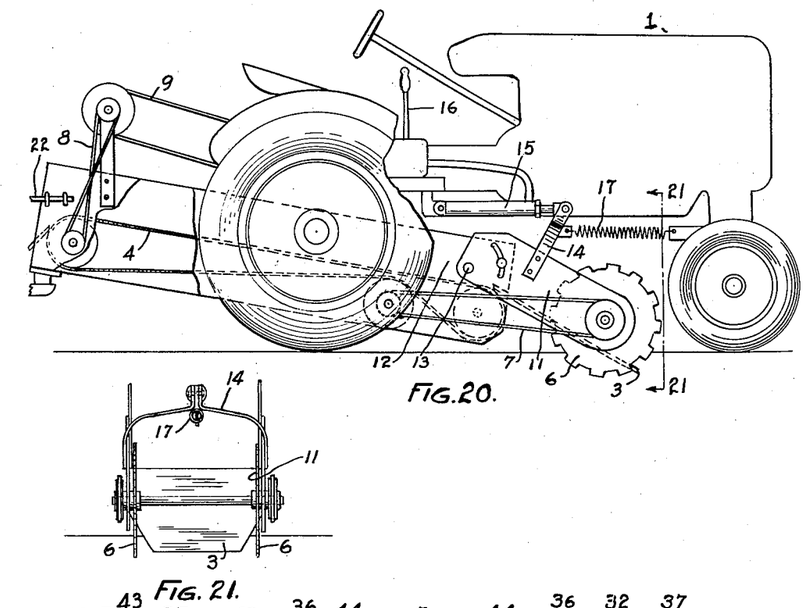
Fig. 20 is an enlarged side elevation having portions cut away, showing the tractor unit equipped with a coulter mechanism.
Fig. 21 is a sectional detail view of the coulter mechanism as seen along the line 21—21 shown in Figure 20.

When the tractor has to operate in muck soil the coulter blades 6 are provided at each side of the digging blade slightly in the rear of the forward edge thereof and are power driven by means of belts 7 so as to sever the compacted mass of soil and permit it to be lifted as a substantially integral strip onto the conveyor belt 4 which in turn is power driven by means of a belt 8 cooperating with suitable transmission means operated direct from the tractor by means of a driving belt 9. By reference to Figures 20 and 21, it will be noted that the digging blade 3, and the coulter blades 6 are supported in a frame 11 pivoted to the frame 12 of the conveyor element 4 by means of a pivot pin 13 and having a supporting yoke 14 connected with a hydraulic cylinder 15 operable by a lever 16 to raise the blade to any degree desired through the reciprocation of such lever and to release the blade to drop by gravity when further adjustment is desired. A spring 17 anchored to the yoke and to the tractor body may be used to assist in lowering the mechanism just described and holding it in firm contact with the surface operated on.

Variations may be provided in the hydraulic control of the digging and coulter blades, or either of them. The firmness with which the blades are held and the rapidity of the adjustment of the digging blade in relation to the soil operated on is of extreme importance in connection with certain types of soils, and particularly those heavily intermixed with roots and rocks and similar foreign matter.

As heretofore indicated, the tractor 1 is of conventional structure and preferably is adapted to straddle a row of potatoes and upon its completion of the harvesting of a row, having a turning radius that permits it to return to the other end of the field along a row closely adjacent the row just completed without loss of time and with a high rate of output.

Figures 3, 4:
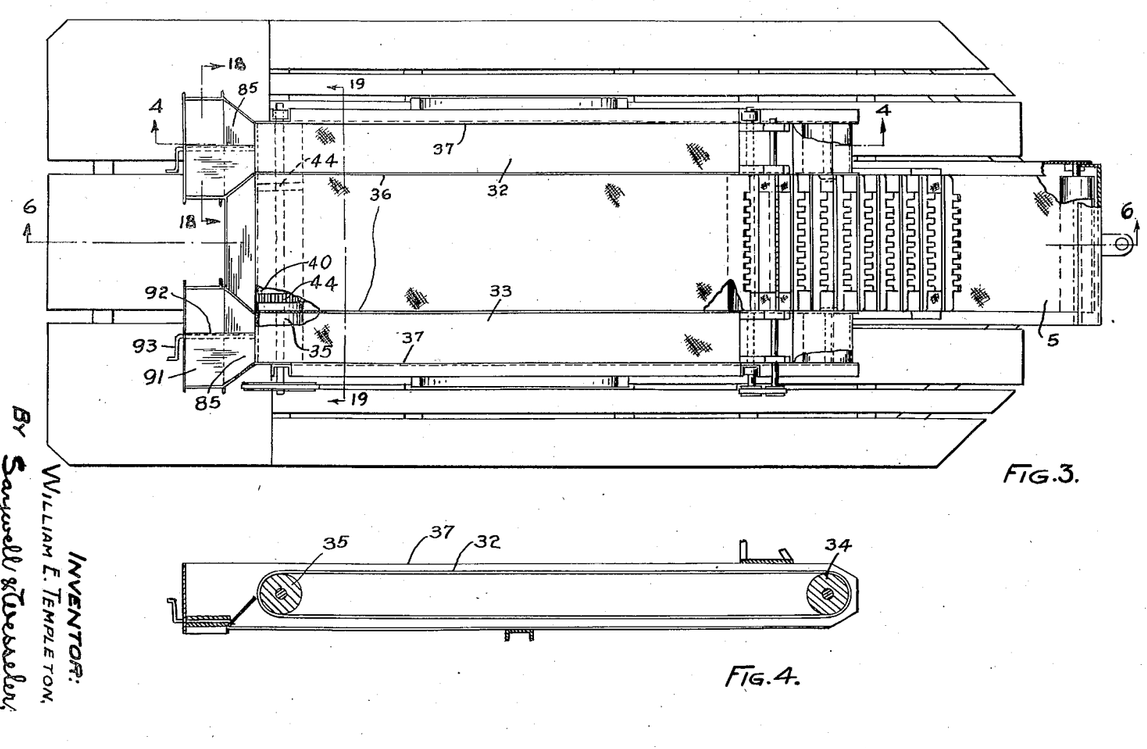
Fig. 3 is an enlarged top plan view, partly in section, showing the sorting and sacking unit illustrated in Figures 1 and 2.
Fig. 4 is a vertical sectional view showing details of construction of one of the sacking conveyors illustrated in Figures 1 and 3, and taken along the line 4—4 shown in Figure 3 looking in the direction of the arrows.
Figure 5:
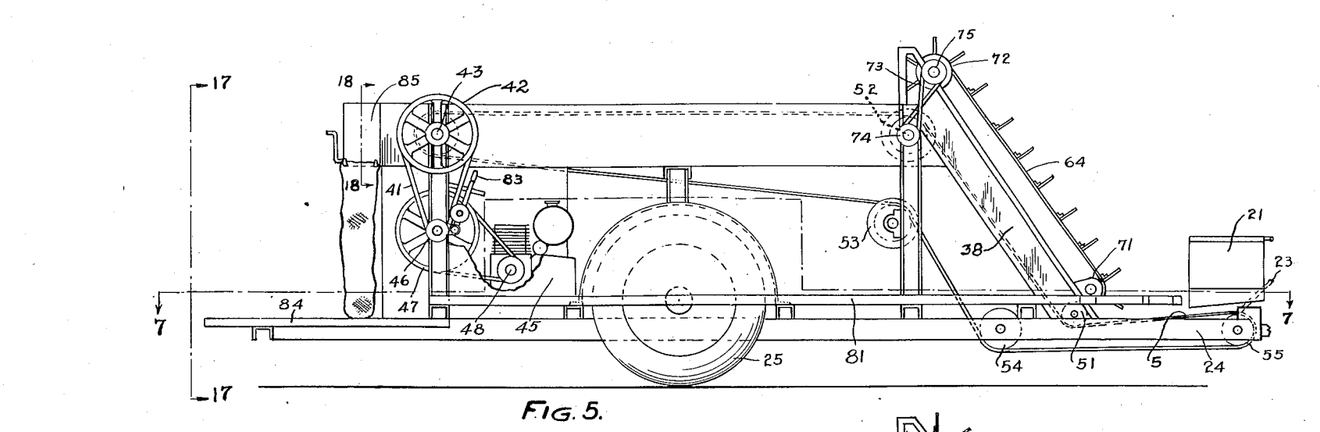
Fig. 5 is a side elevation, partly broken away, of the combine portion of the apparatus.
Figure 19:
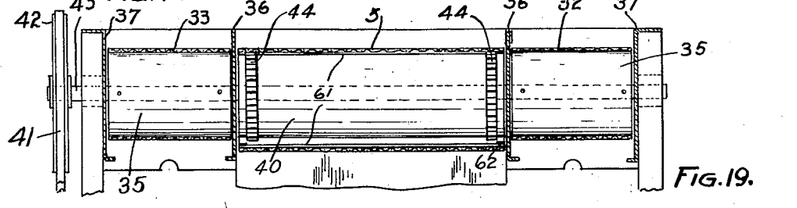
Fig. 19 is an enlarged sectional detail view of the conveyor supporting rollers as seen along the line 19—19 shown in Figure 3.

As has been indicated, the potato bearing strip of earth after being severed from the adjacent soil is conveyed rearwardly upon the conveyor belt 4 within the frame member 12 of the tractor unit and then passes rearwardly between the guard plates 21 supported by bracket arms 22 on the tractor frame 12 and controlled as to position by means of bracket arms 23 on combine frame 24. The combine frame may be variously constructed, but in the form illustrated is used as a two-wheel trailer, the wheels 25 being positioned at an intermediate point preferably adjacent a vertical frame member 26 and between cross frame members 27, 28. The vertical frame member 26 and front and back frame members 29, 30, serve to support above the main combine frame 24, the top frame 31. This top frame, as shown more particularly in Figure 3, provides a central area for the main conveyor belt 5 and two lateral conveyor belts, 32, 33. These lateral conveyor belts are supported on rollers 34, 35, and extend substantially horizontally the full length of the top frame. They operate intermediate longitudinal partition members 36, 37, on the inner and outer sides respectively, such partition members projecting slightly above the top level of such belt conveyors so as to prevent the movement of material on the belt in a lateral direction. The inner frame members have downwardly directed angular extensions 38. The lateral belts 32 and 33 are of narrow width as compared with the main conveyor belt 5, heretofore referred to. It will be noted by reference to Figure 5 that the main conveyor belt 5 passes upwardly from the initial level of the lower frame member 24 to the sorting level at which are positioned the lateral conveyor belts 32, 33, intermediate the partition members 36. As is shown more particularly in Figure 19 the lateral belts as well as the central main conveyor belt are driven by means of a belt 41 extending over a pulley 42 engaged upon a shaft 43 connected with the rollers 35 which drive the lateral belts, and with the sprockets 44 which drive the main conveyor belt 5, which sprockets are at each side of the central roller 40 which provides the rearward support for the main conveyor belt. The combine unit may receive power through a transmission line from the tractor unit, but it has been found satisfactory to operate the belts of the combine from a small self-contained power unit 45, which, as shown in Figure 5, drives the belt 41 through the pulley 46 on the shaft of the larger pulley 47 driven directly from the drive shaft of the motor 48. The belt 5, it will be noted, passes over the idler pulleys, or marginal rollers 51, beneath the shielding plate 50, and over the idler rollers 52, 53, 54 and 55, and has an angular upward flight or path serving to shift or screen loose soil from the sub-soil product.

Figure 6:
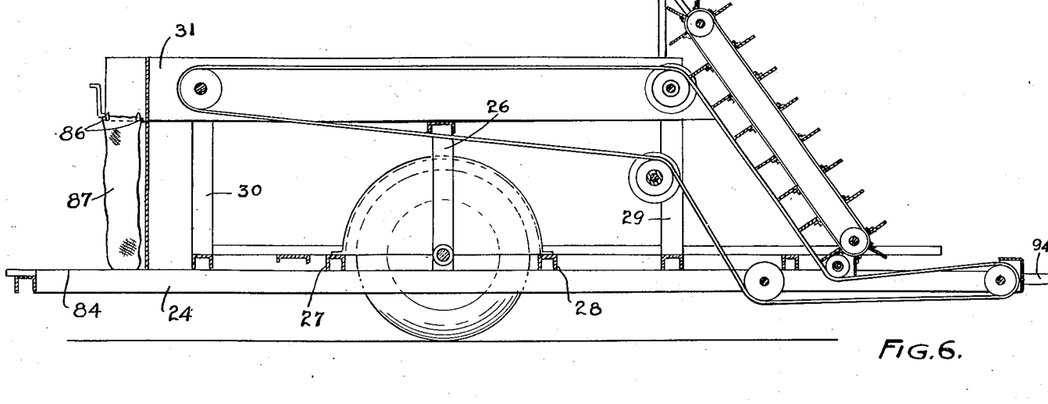
Fig. 6 is a central vertical sectional view of the structure shown in Figure 3 as seen along the line 6—6 looking in the direction of the arrows.
Figures 7, 14, 15, 16:
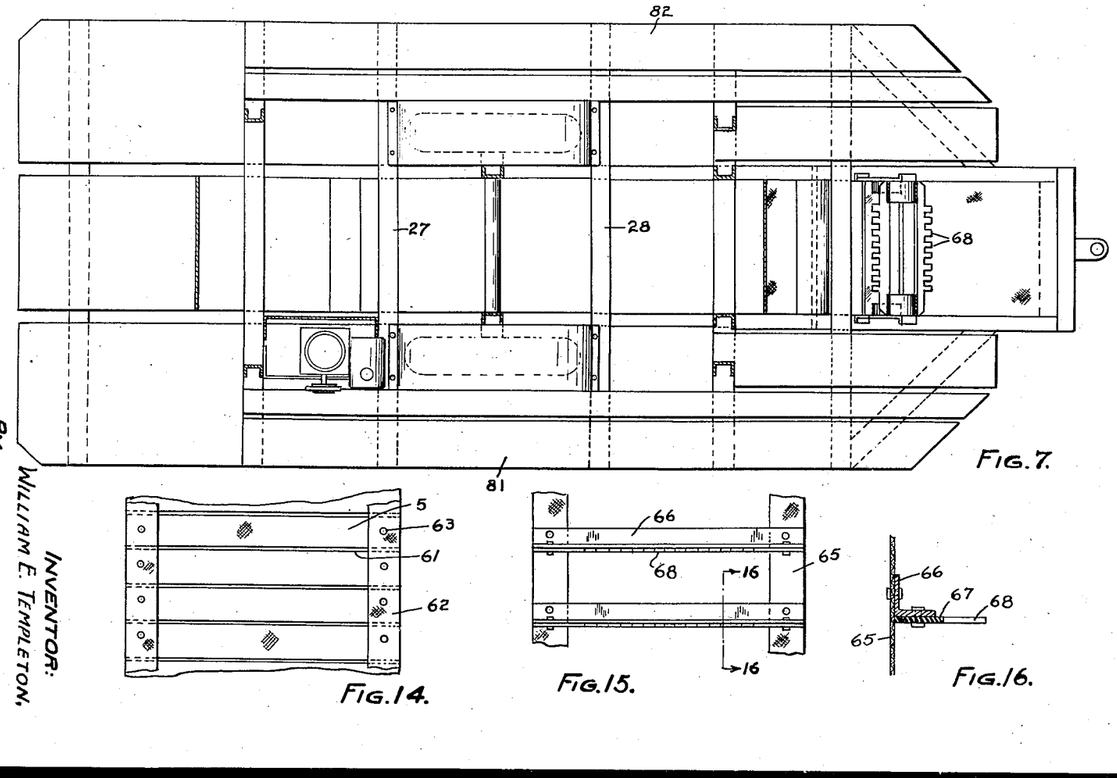
Fig. 7 is a plan view, partly in section, taken along the line 7—7 shown in Figure 5 looking in the direction of the arrows.
Fig. 14 is a fragmentary bottom plan view of the main conveyor belt structure providing along its path of movement the screening and elevating area, and the sorting level of the combine unit.
Fig. 15 is a fragmentary plan view of the cleated or bladed conveyor belt for carrying the harvested product to the sorting level in conjunction with the main conveyor belt.
Fig. 16 is an enlarged sectional detail view taken along the line 16—16 shown in Figure 15 looking in the direction of the arrows and showing the blade fastening means.

The construction of the main conveyor belt 5 may vary, but it has been found that a construction of the character shown in Figure 14 is inexpensive to manufacture and to maintain in continuous operation. The heavy fabric body of the belt 5 is preferably provided with supporting cross-bars 61 having their ends encased in a marginal strip 62 secured to the main body of the belt by means of rivet-type fasteners 63, or any other suitable means of securing the same. The bars, or rods 61, provide a positive drive for the belt 5 by engagement with the teeth of the driving sprockets 44, and also serve to provide pocketed areas within which the material being harvested may rest, particularly while being moved in an upward direction, as will be hereinafter explained. This upward movement of the harvested material, it will be noted by reference to Figures 5 and 6, is accomplished by means of a companion overlying belt in the form of a bladed conveyor, or apron belt, 64, having the detailed structure shown in Figures 15 and 16. The body of the bladed conveyor belt is cleated, being provided with fabric side strips 65 to which are secured angle bars 66 by means of bolts or other suitable fasteners, the vertical portions of such angle bars having secured thereto blade members 67 preferably formed of fabric having serrations at its free end so as to provide what may be termed "rubber fingers" 68. These rubber fingers, or cleats, when brought into contact with a strip of potato bearing material act against the same with a resilient pressure so distributed that no injury is caused to the potato or other material being harvested, and yet the product so harvested is held firmly and moved to the top of the sorting table area in a uniform and dependable manner so that rapid progress can be made with the harvesting, sorting and sacking operations. The belt 64 is engaged over an idler pulley or roller 71 adjacent its lower end and engages over a driven roller 72 at its upper end operated by means of the belt 73 connected with the pulley 74 on the shaft of the idler roller 52 of the main conveyor belt 5 and operating the driven roller 72 through the pulley 75.

The potatoes, when received from the conveyor, may be agitated by elliptical sprockets set up along the lower horizontal path of the belt 5, and the soil thus loosened is further separated by the pressure of the cleats or fingers 68 and bars 61 and discharged downwardly from the angular portion of the main conveyor belt path.

The combine frame 24 is provided with a platform 81, 82, at each side, as shown more particularly in Figure 7. The platform rests upon the extensions of the cross members of the frame including the central members 27 and 28 heretofore referred to and provides abundant standing room for a crew of sorting operators to transfer the potatoes from the main conveyor belt to the lateral conveyor belts as the strip of harvested material travels longitudinally from front to rear centrally of the top level of the combine unit, the discarded material discharging centrally to the ground at the end of the sorting level.

Figure 17:
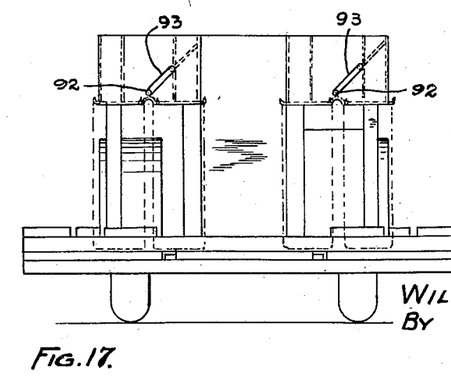
Fig. 17 is a rear elevation of the sack or receptacle filling mechanism of the combine unit as seen along the line 17—17 shown in Figure 5.
Figure 18:
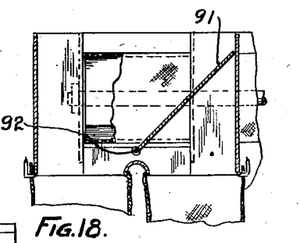
Fig. 18 is an enlarged sectional detail view of the receptacle filling mechanism as seen along the line 18—18 shown in Figure 5.

It will be noted that the unit power plant 45 is conveniently accessible to any one standing on the platform 81 and that a control lever 83 permits the driving power to be cut off without stopping the engine. In addition to the lateral platforms 81, 82, a rear platform 84 is provided. The rear platform provides standing room for the operators to control the filling of the sacks with the potatoes traveling down the lateral conveyor belts 32, 33. The rear platform thus provides space for the sacking crew and the lateral platforms continuous therewith, provide space for the sorting crew. As is shown more particularly in Figures 3, 5 and 6 the lateral conveyor belts discharge into hoppers 85 having hooks, or other supporting devices 86 around their lower outer areas to receive empty sacks 87 with their lower ends resting on the platform 84. Each hopper, as will be seen more particularly by reference to Figures 17 and 18, is of a size to accommodate two sacks in transverse alignment. Centrally of each hopper a deflecting plate 91 is provided, such plate being pivoted on a bar 92 terminating in a crank arm 93 projecting through the rearward wall of the hopper at a central position. It will be noted by reference to Figure 18 that the plate when resting against the right-hand wall of the hopper will divert potatoes or other harvested products into the left-hand sack, and that when reversed in position it will divert such products to the right-hand sack. From what has been stated as to the construction of the hopper mechanism it will be clear that while one sack is filling, the operator on that side of the apparatus will find it necessary to remove the full sack and place it on the ground or in a suitable trailer attachment, and then place an empty sack in place of the removed sack, and thereafter repeat the operation with reference to the sack which has been filling in the interval. With an adequate crew separating the potatoes from the vines and a reasonably high rate of travel of the conveyor belts the harvesting of a potato crop may be carried out at a very high rate of speed.

It should be noted that with a conveyor belt at each side of the sorting top it is possible to place the larger potatoes at one side of the apparatus and the smaller potatoes at the other side of the apparatus and thus provide a classification of the potatoes while they are being harvested. The apparatus also permits of the addition of one or more belts to take care of an intermediate size potato, should that type of classification be important in the locality where the potatoes are harvested.

As heretofore stated where the apparatus is to be used in localities where there are large field stones, or similar units of material, of more than average size, difficulties will at times be encountered with the rigid type of bladed elevating conveyor which will not provide adequate clearance for such extra sized objects. In order to provide a combine unit adapted for work in fields of this character for harvesting sub-soil products, a floating type of elevating conveyor, or apron, is provided, as illustrated in Figures 9 to 12, inclusive. The semi-floating conveyor, it will be noted by reference to Figures 9 and 10, provides a frame work and main belt of the type heretofore described, such parts being designated by reference characters similar to those heretofore utilized in the description of Figures 5 and 6 more particularly. In place, however, of having the elevating conveyor secured at its lower end it is supported on an adjustable frame 100, illustrated in detail in Figure 13. The frame comprises a sleeve 101 within which is telescopically engaged a second sleeve 102 within which in turn a supporting bar 103 is telescopically engaged. The sleeve 101 has a split section 104 at its free end adapted to be brought into clamping relation upon the sleeve 102 by means of the clamping bolt 105. The sleeve 101 is provided at its outer end with a pair of arms forming a yoke 106, the arms having apertures to receive a shaft 107, the ends of the shaft having flanged rollers 108 mounted thereon and placed a suitable distance to support a bladed conveyor belt 109, such belt being of similar construction to the belt 64, heretofore described. The supporting bar 103 is provided at its free end with a pair of arms forming a yoke 111, the outer ends of such arms being perforated to receive a shaft 112 at the outer ends of which flanged rollers 113 are provided, such rollers being spaced from each other an equal distance to the spacing of the rollers 108 heretofore described, and forming the running support for the conveyor belt 109 at its lower end.

The shaft 107 is provided with a drive pulley 114 operated by a belt 115 connected with a pulley 74 of the combine unit heretofore described. It will be noted by reference to Figure 9 that when a large field stone 116 is carried upon the main belt toward the elevating conveyor that the blades of said conveyor will rise above the upper surface of the stone and ride completely over the same, and thereafter the belt will exert an elevating or lifting effect upon the stone until it is brought to the level of the sorting table where it can be freed of adherent material and discarded by the operators stationed at either side of the sorting level.

Figures 8, 11:
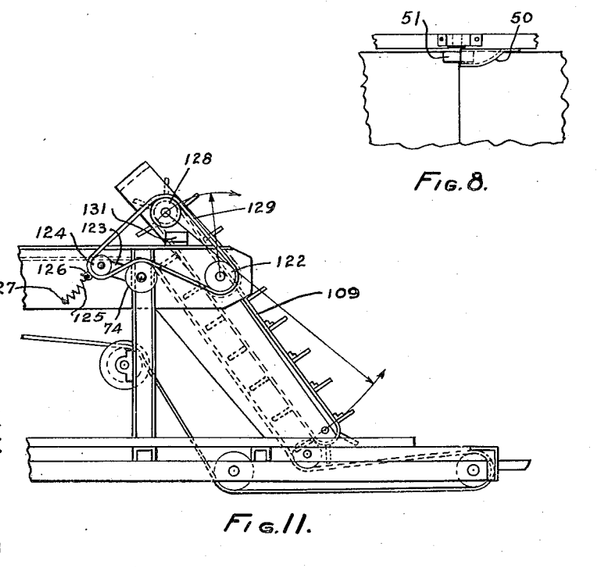
Fig. 8 is a fragmentary detail plan view showing the deflecting blade and shield over one of the idler or marginal rollers.
Fig. 11 is a fragmentary side elevation of the forward section showing a modified structure having a full floating bladed conveyor or apron belt embodying the principles of the invention.
Figures 9, 10, 13:
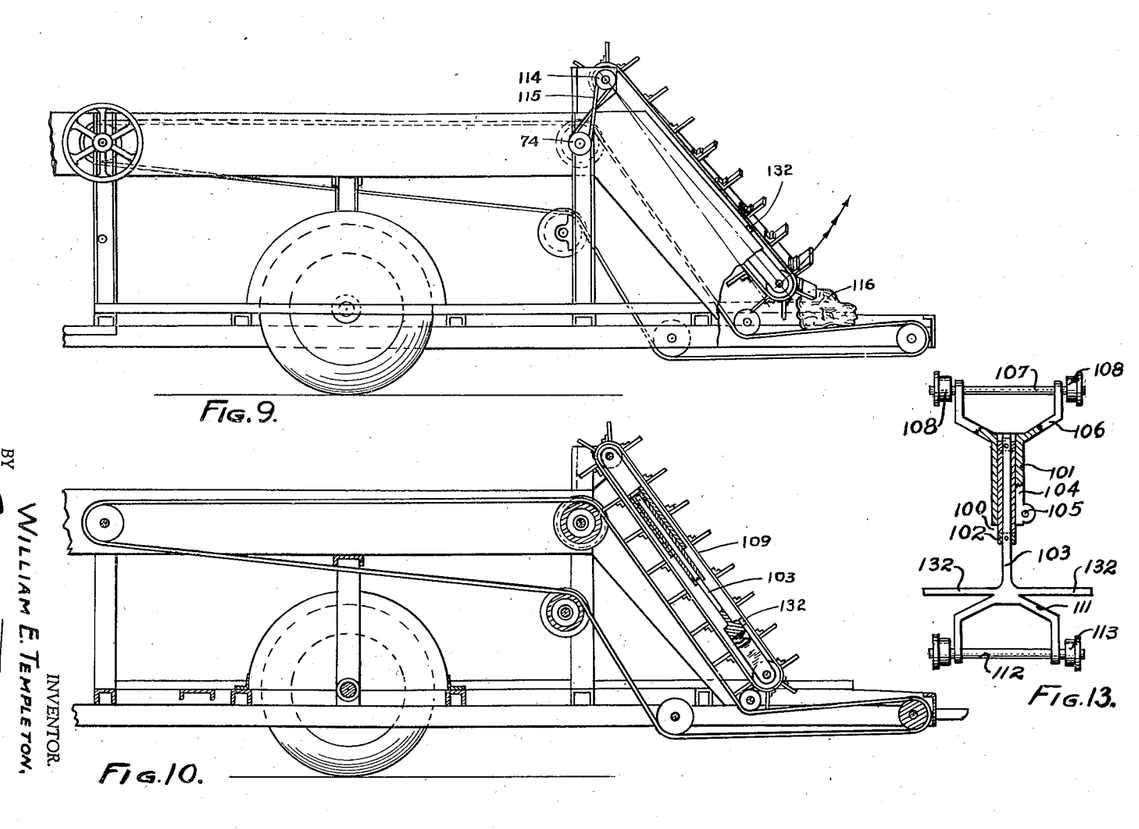
Fig. 9 is a fragmentary side elevation, partly in section, showing a modified form of structure having a semi-floating bladed conveyor or apron belt embodying the principles of the invention.
Fig. 10 is a central vertical sectional view of the structure shown in Figure 9.
Fig. 13 is a detail view, partly in section, of the adjustable support for the bladed conveyor or apron belt shown in Figures 9, 10, 11 and 12.
Figure 12:
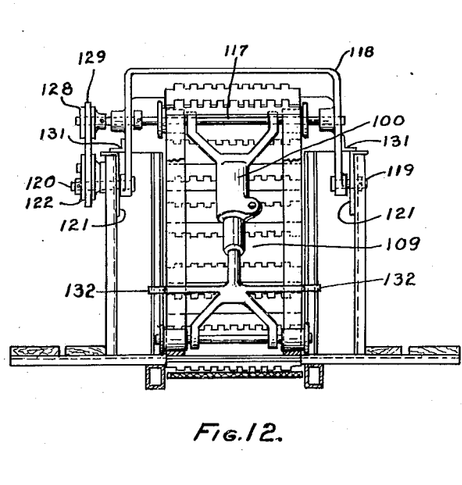
Fig. 12 is a front elevation, partly in section, of the structure shown in Fig. 11.

The elevating conveyor mechanism just described will accommodate oversize field stones and the like of moderate excess of dimensions, but in order to provide a mechanism adapted to accommodate field stones of even larger size it is desirable to provide a companion belt in the form of a full floating conveyor belt at the forward end of the apparatus, as illustrated in Figures 11 and 12. The conveyor belt 109 is supported upon an adjustable frame 100 of the type heretofore described, but the upper shaft 117 is carried in a frame member 118 of inverted U-shape, such frame member being supported on a pivot 119 at one end and upon a stub shaft 120 at its opposite end, such pivot and stub shafts engaging through suitable openings in the extensions 121 of the upper lateral members of the main frame of the combine unit. The stub shaft 120 carries an idler pulley 122, and upon a shoulder bracket arm 123 carries a second idler pulley 124 normally held in a downward position by means of a tension spring 125 attached to an eye 126 on said bracket, and to a pin 127 on the upper lateral frame member of the combine. The shaft 117 projects through the frame 118 and carries at its outer end a drive pulley 128 over which a belt 129 engages, said belt extending also over the idler pulleys 122 and 124 and over the main drive pulley 74 of the combine unit which has been heretofore described in connection with the apparatus disclosed in Figures 5 and 6.

It will be noted that the full floating type of belt just described may be designated as "self-adjusting," since it will rotate in an upward direction about the axis provided about the pivot 119 and the stub shaft 120, and that after the obstacle passes beneath the point of support of the frame 118 the belt will then be free to ride over such enlarged object at its upper end, the parts being adapted to move away from the main conveyor belt an adequate distance to allow such object to have free passage.

A stop 131 may be provided on the frame 118, such stop bearing against the upper edge of the extension of the main frame and preventing contact with the main conveyor belt at the upper end when the elevating conveyor swings downwardly. Similar stop members 132 may be provided on the lower yoke to bear against the side frame to prevent the lower portion of the elevated belt from contacting the main conveyor belt directly.

The connection between the tractor and the combine unit may be through the use of a conventional coupler 94, and as has been stated is preferably of such character as to permit the entire harvesting unit to move from one row for a return trip down the field through a row closely adjacent thereto. The entire conveyor system operates continuously, and the strip of potato bearing material progresses over the digging blade and belt section of the tractor onto the main conveyor belt at a high rate of speed and adequate to keep a crew of operators continuously busy to properly care for the product as it passes over the sorting table and into the sacks.

As has been indicated variations in many of the features of the construction may be made without departing from the spirit of the invention and where potatoes are planted in certain types of soil in closely spaced rows it may be found advantageous to provide twin units of digging and conveyor belt systems to take care of the product being harvested. It is to be understood that the apparatus is also adapted for harvesting crops other than potatoes, and that it is not intended to restrict the use of the apparatus to any particular product so long as the principal features of the invention are adaptable thereto. The apparatus may be built as a single piece of apparatus instead of as a tractor and trailer type of structure, but such apparatus would probably involve removable or convertible parts for other seasonable demands.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A sorting and distributing mechanism for subsoil products comprising a frame providing an initial level and a sorting level, a conveyor belt positioned longitudinally centrally of said frame and having an initial horizontal level and inclined elevating portion and a horizontal sorting level, a self-adjusting floating apron in load-riding spaced relation to said inclined portion, a power unit for driving said belt, a lateral conveying member positioned on each side of said conveyor belt and discharging at the rearward ends thereof, a hopper mechanism at the end of each of said last-named conveyor belts, and removable receptacles connected with said hopper mechanisms.

2. A sorting and distributing mechanism for subsoil products comprising a frame providing an initial level and a sorting level, a conveyor belt positioned longitudinally centrally of said frame and having an initial horizontal level and inclined elevating portion and a horizontal sorting level, a self-adjusting floating apron in load-riding spaced relation to said inclined portion, a power unit for driving said belt, a lateral conveying member positioned on each side of said conveyor belt and discharging at the rearward ends thereof, a hopper mechanism at the end of each of said last-named conveyor belts, a pair of receptacles connected with each hopper mechanism, and means for diverting the harvested products selectively into one of said pairs of receptacles.

3. A trailer unit for attachment to a potato digging unit comprising a frame providing an initial level and a sorting level, a conveyor belt on said frame having an initial receiving level, an intermediate inclined elevating level and an upper sorting level, said conveyor belt being formed of metal cross rods and a canvas web, sprocket rollers adapted to engage and drive said belt through said cross rods, a power unit for driving said sprocket rollers, a cleated companion belt positioned angularly above the inclined portion of said conveyor belt and carrying a plurality of spaced projecting resilient finger cleats to space and convey portions of harvested material up the inclined portion of said conveyor belt to the sorting level thereof, means for independently driving said companion conveyor belt, and means for applying a predetermined degree of tension on said companion conveyor belt.

4. An apparatus for harvesting sub-soil crops comprising a frame, a main conveyor belt providing a substantially horizontal elevated sorting area over the main portion of said frame and an upwardly inclined flight for conveying harvested material thereto with a horizontal receiving portion at a lower level, an angularly positioned companion belt disposed in free self-adjusting floating relation above said upwardly inclined flight and having elements automatically varied in spaced relation to the main conveyor belt through contact with the material on said main conveyor belt, and means for driving said belts.

5. A trailer unit for attachment to a potato digging unit comprising a frame having a pair of wheels at an intermediate position thereof, a platform for an operative crew extending around the side and end portions of said frame, a substantially horizontal elevated platform over the main portion of said frame formed of a central conveyor belt and two lateral conveyor belts, an upwardly inclined flight for the central conveyor belt, an angularly positioned companion belt disposed above said flight and having a plurality of transverse cleated members of resilient material at spaced intervals thereof, a power unit for driving each of said belts supported on said trailer, a pair of hoppers at the end of each lateral conveyor belt, and means for associating receptacles with the discharge outlets of said hoppers.

6. A trailer unit for attachment to a potato digging unit comprising a frame having a pair of wheels at an intermediate position thereof, a platform for an operative crew extending around the side and end portions of said frame, a substantially horizontal elevated platform over the main portion of said frame formed of a central conveyor belt and two lateral conveyor belts, an upwardly inclined flight for the central conveyor belt, an angularly positioned companion belt disposed above said flight and having a plurality of transverse cleated members of resilient material at spaced intervals thereof, a power unit for driving each of said belts supported on said trailer, a pair of hoppers at the end of each lateral conveyor belt, means for associating receptacles with the discharge outlets of said hoppers, and a distributing member for directing harvested material from said hoppers selectively into one of a plurality of receptacles.

WILLIAM E. TEMPLETON.